(12) United States Patent
Ehrfeld et al.

(10) Patent No.: US 6,851,174 B2
(45) Date of Patent: Feb. 8, 2005

(54) INTEGRALLY CAST MAGAZINE FOR MICROCOMPONENTS

(75) Inventors: Wolfgang Ehrfeld, Mainz (DE); Heinz Lehr, Berlin (DE); Lutz Weber, Gabsheim (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 0 days.

(21) Appl. No.: 10/347,651

(22) Filed: Jan. 21, 2003

(65) Prior Publication Data

US 2003/0157751 A1 Aug. 21, 2003

Related U.S. Application Data

(62) Division of application No. 09/380,539, filed as application No. PCT/EP98/01134 on Feb. 27, 1998, now Pat. No. 6,531,080.

(30) Foreign Application Priority Data

Mar. 6, 1997 (DE) ......................................... 197 09 136

(51) Int. Cl.$^7$ ................................................. B21B 1/46
(52) U.S. Cl. ................................... 29/527.1; 264/271.1
(58) Field of Search .......................... 29/809, 412, 413, 29/458, 527.1; 264/255, 272.14, 273, 274, 279.1, 271.1

(56) References Cited

U.S. PATENT DOCUMENTS

| | | | | |
|---|---|---|---|---|
| 236,383 A | * | 1/1881 | Waldeck | 264/271.1 |
| 1,556,240 A | * | 10/1925 | Morrissey | 29/809 |
| 1,808,324 A | * | 6/1931 | Smith | 264/279.1 |
| 2,547,941 A | * | 4/1951 | Heftler | 29/412 |
| 3,322,871 A | | 5/1967 | Noack et al. | |
| 3,472,365 A | * | 10/1969 | Tiedema | 206/486 |
| 3,916,513 A | | 11/1975 | Ballard | |
| 4,217,326 A | * | 8/1980 | Goralnik | 264/271.1 |
| 4,294,396 A | * | 10/1981 | Obata et al. | 29/879 |

(List continued on next page.)

FOREIGN PATENT DOCUMENTS

| | | |
|---|---|---|
| DE | 85 17 432.7 | 3/1986 |
| DE | 41 41 775 A 1 | 6/1993 |
| DE | 195 35 971 A 1 | 4/1997 |

OTHER PUBLICATIONS

Flexible Montage von Miniaturbauteilen, F&M, Feinwerktechnik, Mikrotechnik, Mikroelektronik 105, pp. 43–45, 1993.

(List continued on next page.)

*Primary Examiner*—David P. Bryant
(74) *Attorney, Agent, or Firm*—Hudak, Shunk & Farine, Co. LPA (57) ABSTRACT

Disclosed is a method to simplify the handling of micro-components, wherein a micro-component is initially produced on a micro-component base plate. At least the open side surfaces of the micro-component are then cast using a hardening molding material whereupon the base plate and/or the molding material covering the micro-component is removed. The magazine for at least one micro-component comprises of a disk-shaped plate encompassing the micro-component at least one its lateral surfaces is positive joint. The assembly method for micro-components includes a magazine which is configured in the form of a disk-shaped plate containing at least one micro-component which encompasses at least on one of its sides in positive fit. Said magazine is held and maintained by a retaining device, whereupon the micro-component which is to be assembled is squeezed out of the magazine and simultaneously positioned in a specific location.

14 Claims, 7 Drawing Sheets

U.S. PATENT DOCUMENTS

| | | | | |
|---|---|---|---|---|
| 4,490,321 A | * | 12/1984 | Klinkau | ................. 264/271.1 |
| 4,604,799 A | | 8/1986 | Gurol | |
| 4,915,256 A | * | 4/1990 | Tump | ............................ 221/5 |
| 5,273,701 A | | 12/1993 | Marlin | |
| 5,518,674 A | | 5/1996 | Powell et al. | |
| 5,567,362 A | | 10/1996 | Grün | |
| 5,709,303 A | * | 1/1998 | Best | ............................ 29/33 J |
| 6,138,866 A | * | 10/2000 | Lambelet, Jr. et al. | ........ 221/25 |
| 6,164,448 A | * | 12/2000 | Schmutz et al. | ............ 206/488 |
| 6,200,508 B1 | | 3/2001 | Jacobson et al. | |
| 6,308,398 B1 | * | 10/2001 | Beavers | ....................... 29/412 |

OTHER PUBLICATIONS

41$^{st}$ International Scientific Colloquium of the Technical University of Ilmenau, Sep. 25, 1996.

IBM Technical Disclosure Bulletin, Cornerless Chip Bank, vol. 36, pp. 395 & 396, May 5, 1993.

* cited by examiner

INTEGRALLY CAST MAGAZINE FOR MICROCOMPONENTS

CROSS-REFERENCE

This is a division of application Ser. No. 09/380,539, filed on Dec. 20,1999, of Wolfgang Ehrfeld, et al., for METHOD FOR PRODUCING AND MAGAZINING MICRO-COMPONENTS, MAGAZINE AND ASSEMBLY METHOD FOR MICRO-COMPONENTS which is a 371 of PCT/EP98/01134 filed Feb. 27,1998.

BACKGROUND OF THE INVENTION

The invention concerns a method for the manufacture and magazining of micro-components and a magazine for at least one micro-component and an assembly method for micro-components.

The conventional procedure used in the past for the magazining of micro-components consist of delivering the components on carrier and transport devies such that they can be accepted from the carriers for the asembly process by means of special grasping tools. Depending on the constrution of the individual components, the micro-components are mounted at defined intervals to one-sided bonding tapes (bluetape) or are fixed in the proper position in so-called gelpacks (F&M (Feinwerktechnik, Mikrotechnik, Mikroelectronik) 105,43-45 (1997)). Other methods consist of positioning the micro-components in checker-board-like depressions of rectangular trays or in modular magazines int he proper position to be accessible for grasping (41st International Scientific Colloquium of the Technical University of IImenau, Sep. 25, 1996. The scheme of arrangement allows a defined grasping or accepting of these parts from the carrier.

A drawback of this method, however, is that the arrangement scheme of the manufacturing process is often not used for relative positioning and ordering of the parts, but rather the micro-components are initially delivered as bulk material and then in a time-consuming manner are set on the above mentioned transport means in the proper position to be accessible for grasping. Thus in this manufacturing process, an intermediate step is necessary for magazining, the complexity of the magazining step is considerable and is comparable in expense with the subsequent micro-assembly step.

SUMMARY OF THE INVENTION

The purpose of the invention is to provide a method and a magazine which simplifies the handling of micro-components.

It is also the purpose of the invention to improve handling in the assembly of micro-components.

The method for th manufacture and magazining of mirco-components is characterized by the following steps:

a. Forming nof at least one micro-component on a component base plate.
b. Overmolding or casting at least the exposed lateral surfaces of the micro-component using a hardening mold material.
c. Removal of the component base plate and/or of the molding material covering the micro-component.

The magazine is also a subject of the claims.

The first step of the method according to the invention concerns the forming of one or several micro-components, whereby the simultaneous production of a group of micro-components on the surface of a component base plate is preferred.

The micro-component or micro-components and the component base plate can be produced separately. The simultaneous production of the micro-components and the component base plate, however, is preferred because one manufacturing process is thereby eliminated and the position of the micro-component on the component base is already established in the production process, so that a positioning process is also eliminated.

A further advantage of the joint production of the component base plate and the micro-component is, by way of example, that larger quantities of material (so-called shot weight) can be used in injection molding.

In addition, the injection nozzle can be attached to the component base plate, which is advantageous with respect to the dimensioning of the injection-molding nozzle because no adaptation to the far smaller micro-components is necessary.

In addition to injection molding, other forming methods, such as hot embossing, reaction molding, or electroforming may be used which allow the comparatively technically simple, and at the same time cost-effective, manufacture of a large number of micro-components. In addition, the micro-components and the component base plate can be produced by machining processes, by electroerosive machining, by an etching process or by a laser ablation process.

Plastics, ceramics, metal, silicon, and glass are suitable as materials for the micro-components and/or the component base plate.

Furthermore, the arrangement of several micro-components on a common component base plate simplifies handling because each individual micro-component does not have to be transported.

The component base plate is preferably produced with an exterior contour which conforms to the exterior contour of the magazine. The exterior contour advantageously conforms to the exterior contour of a compact disc or of a 5-inch silicon disk because as a result, conventional gripping devices which are known from chip manufacturing may be used. Special gripping systems which are adapted to the forming of micro-components therefore become unnecessary.

For the second processing step, which concern the casting of the micro-component, a hardening molding material, preferably plastic, paraffin, or wax, is used. The casting is preferably an injection molding or vacuum molding process. The casting can take place such that only the lateral surfaces of the micro-components situated on the component base plate are cast so that the micro-component remains accessible on the face side. Depending on the configuration of the micro-component, however, it may be advantageous to cast all exposed surfaces of the micro-component. In this procedure, the component base plate is at least partially cast as well so that the micro-component or micro-components are surrounded on all sides by the component base plate and molding material.

In the third processing step, the actual magazining of the micro-component takes place. After the hardening of the molding material, the component base plate and/or the molding material which covers the micro-component is removed. This can be accomplished by grinding, lapping, milling, or polishing. Preferably both the component base plate and the covering of molding material are removed so that two opposite sides of the micro-component are exposed. The other surfaces of the micro-component are embedded with a positive fit in the molding material. As a result, a disk-shaped plate is created which laterally encompasses one or more micro-components with positive fit, which micro-components remain accessible on the face side.

The advantages of this form of magazining are as follows:

The ordering condition, that is, the defined position of the individual micro-components following production, is retained after transport and the parts can subsequently be used for assembly as well in an ordered manner;

Due to an adapted exterior shape of the disk such as that of a compact disc or of a 5-inch silicone disk, state-of-the-art handling devices can be used for the further processing; and The side surfaces of the micro-components, which as a rule are sensitive, are protected by the molding material of the disk.

Depending on the application of the micro-component, it can be advantageous to coat the exposed surface of the micro-component prior to casting. By the use of a common component base plate, the coating can also be carried out more cost effectively because several micro-components can be subjected to the coating process at the same time. Coating can be performed by a PVD or a CVD process. A plasma treatment or a dip process can also be utilized.

Preferably a wear-resistant layer is applied, which is advantageous in particular in the manufacture of gears. The wear-resistant coating can be removed during the third processing step in the surface area which is to be processed or the third processing step is controlled such that the wear-resistant layer is fully retained. In any case, the wear-resistant layer is left in the embedded regions of the micro-component.

The magazine is characterized by a disk-shaped plate which encompasses the micro-component element with positive fit on at least on its lateral surfaces. Preferably the micro-component or micro-components are arranged in the magazine such that the axis of symmetry of the micro-component is vertical to the plane of the plate. As a result, the micro-component can easily be removed from the magazine. If the micro-component does not have an axis of symmetry, the arrangement in the magazine must be selected so that the micro-component can be pushed out, i.e., the components may not be tapered in the direction in which they are pushed out and cannot have any undercut.

The magazine is preferably round with the exterior contour preferably corresponding to the exterior contour of a compact disk or a 5-inch silicon disk so that known handling devices can be used. It is advantageous for the dimensions of the magazine to correspond to the applicable standard for which corresponding assembly and positioning technologies are available. Among these are fences for alignment of the magazine (so called flat) and holes, as in a CD.

Plastic, paraffin, or wax is preferred as the material for the magazine. Depending on how the magazine is to be utilized for the further handling of the micro-components, it can also be advantageous for the material of the magazine to have optically transparent material. Preferably the magazine is composed of PMMA. To increase stability, stabilizing elements can be inserted in the magazine material which corresponds to the molding material.

The advantage of this magazine is that it can be utilized for the subsequent assembly process of the micro-components. According to the invention, a magazine, which is configured as a disk-shaped plate and encompasses at least one micro-component laterally with positive fit, is grasped and held by a magazine support. The micro-component which is to be assembled then is pressed out of the magazine and is simultaneously positioned in its specified location.

Preferably the disk-shaped magazine is positioned so that the micro-component to be assembled is located directly above or beneath its mounting location. The magazine is preferably held by underpressure by the magazine support. By means of a die, the micro-component can be pressed out of the magazine in a simple manner. Through this method, a multiplicity of micro-component can be handled simultaneously. In addition, no complicated microgripper is required for picking up small and thus especially sensitive components from the magazine or for positioning them at the assembly location. In addition, existing camera systems can also be used for monitoring position in micro-assembly if an optically transparent material is selected as the molding material for the magazine.

Depending on the configuration of the micro-component, it is necessary to remove molding material situated in the interior of the micro-component before the micro-component is pressed out of the magazine. This molding material can preferably be blown out.

Exemplary embodiments of the invention are explained in greater detail using the drawings.

BRIEF DESCRIPTION OF THE DRAWINGS

FIG. 2b is a cross-section along line II—II of the arrangement shown in FIG. 2a

DETAILED DESCRIPTION OF THE INVENTION

Figure 1:
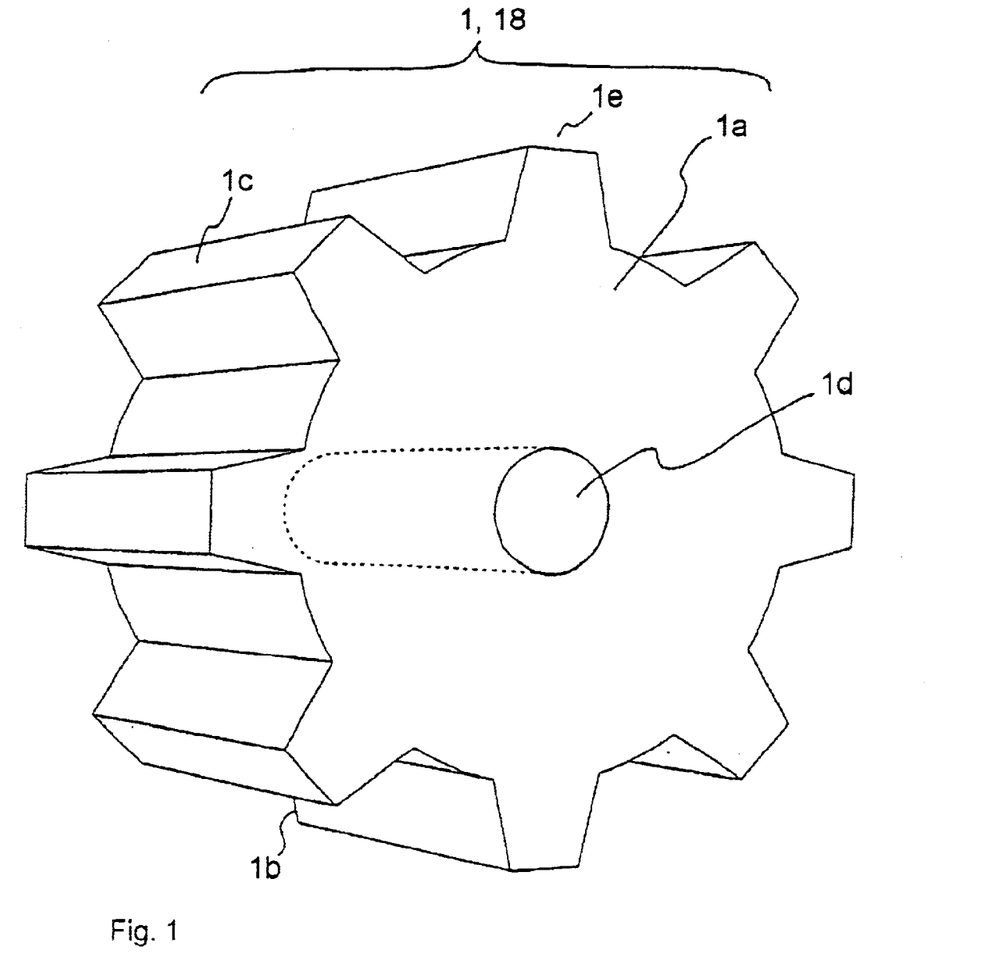
FIG. 1 is a perspective depiction of a microgear

FIG. 1 shows a micro-component 18 in the form of a microgear 1 with its center hole 1d, its upper face 1a, and the shell 1c, which has several teeth 1e. The lower face of microgear 1 bears the reference characters 1b.

Figure 2A:
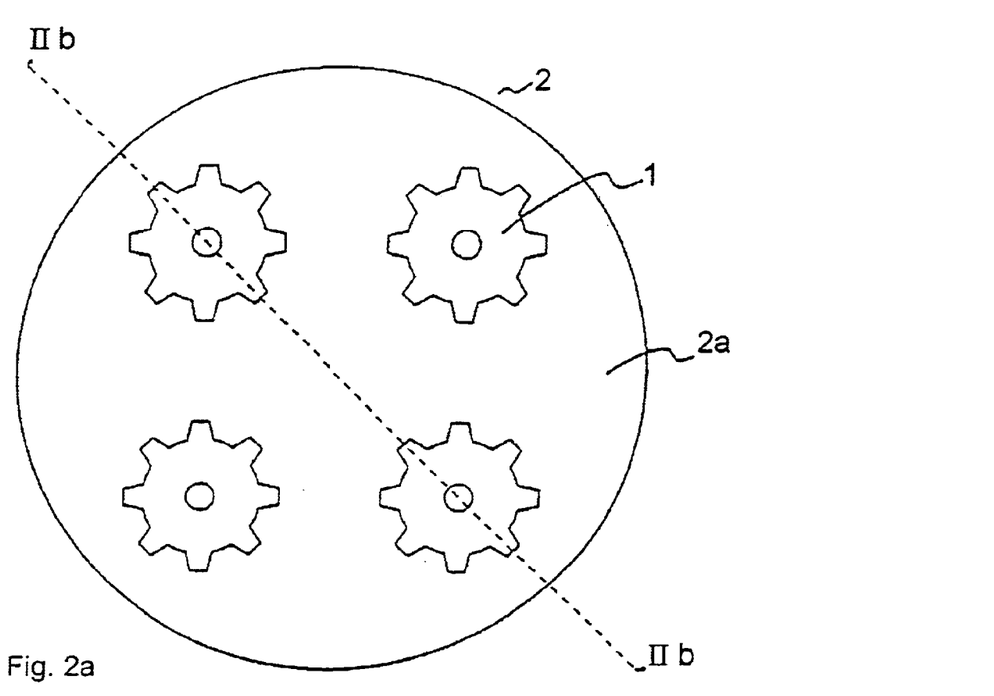
FIG. 2a is a top view of several microgears on a common component base plate

FIG. 2a shows a top view of the entire component base plate 2 having a round shape. Four of the microgears 1 shown FIG. 1 are arranged on the upper side 2a of the component base plate.

Figure 2B:
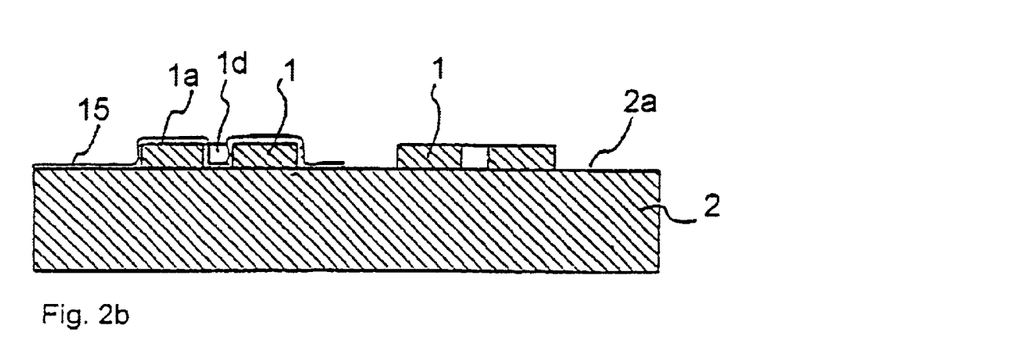

FIG. 2b shows a cross-section through the arrangement shown in FIG. 2a along the II—II. The left microgear 1 in the depiction in addition has a coating 15 which extends over the extire exposed surface of the microgear 1. Coating 15 covers not only the lateral surface, i.e., the teeth 1e and the gaps between, but also the upper face 1a and the surface formed by the center hole 1d.

The component base plate 2 and microgears 1 can be produced simultaneously and from the same material. It is also possible, however, to fabricate the component base plate 2 and microgears 1 separately and subsequently to arrange them on the component base plate. Typical methods for production are molding processes such as injection molding, reaction molding, hot embossing, or electroforming; but processes for direct structuring such as milling, electrical discharge machining or laser ablation are also possible. Typical dimensions of a microgear 1 are in the range of 0.2 mm to 1 mm for the diameter and the height.

Figure 3:
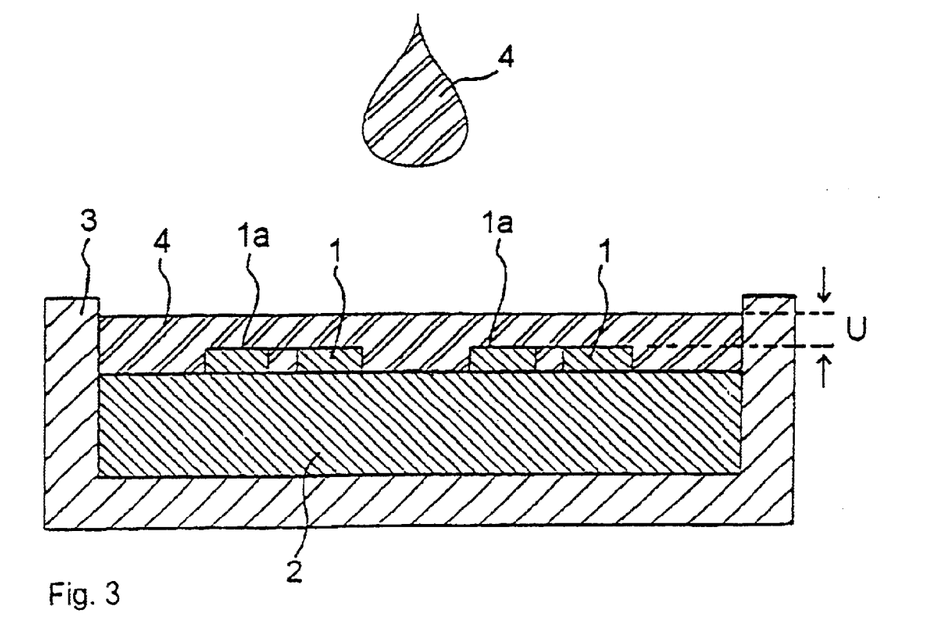
FIG. 3 is a cross-section through a mold with inserted component base plate and microgears arranged thereon

The component base plate 2 along with microgears 1 situated on it is inserted according to FIG. 3 into a mold support 3 which essentially has the shape of a trough. Casting takes place using a molding material 4, which is preferably a plastic. In the depiction shown here, enough molding material is poured into the mold support so that the exposed surface of the component base plate 2 and the microgears 1 are completely embedded in the molding material. The upper faces 1a of microgears 1 are completely covered by molding material 4. Excess Ü in the depiction shown here is on the order of size of the thickness of microgears 1. After molding material 4 hardens, molding material and microgears 1 are joined together with positive fit. Following this, the component base plate with microgears 1 and molding material 4 are removed from mold support 3.

Figure 4A:
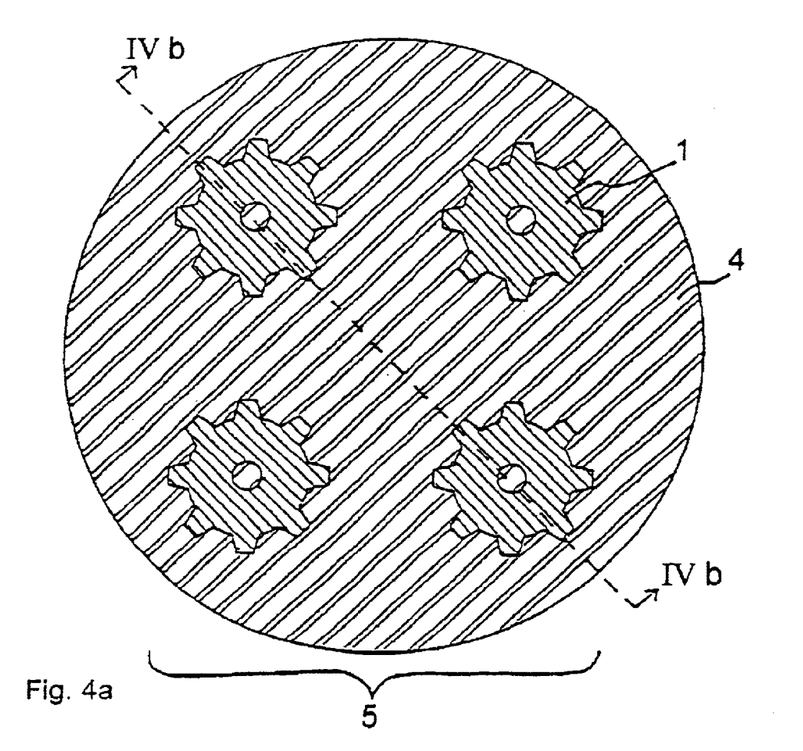
FIGS. 4a, 4b are top view and cross section of a magazine with imbedded microgears
Figure 4B:
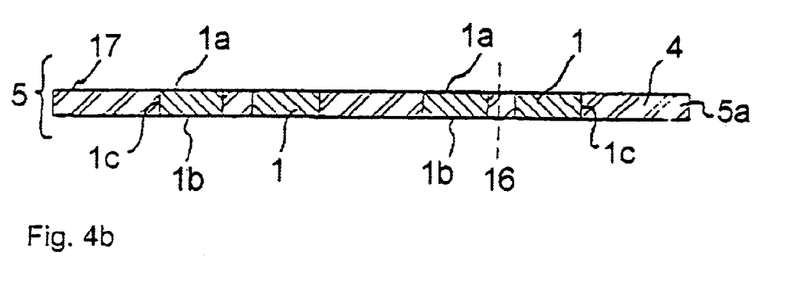

Next, excess Ü and component base plate 2 are removed through an appropriate processing method, preferably a machining process, so that upper face 1a and lower face 1b of microgear 1 are exposed. This is depicted in FIG. 4a in top view and in FIG. 4b in cross section. As a result, a disk-shaped plate 5a is created, the magazine 5, which encompasses microgears 1 laterally with positive fit, but keeps them accessible to the environment on the face side, whereby microgears 1 are arranged in magazine 5 in such manner that axis of symmetry 16 is vertical to the plane of the plate.

Figure 5A:
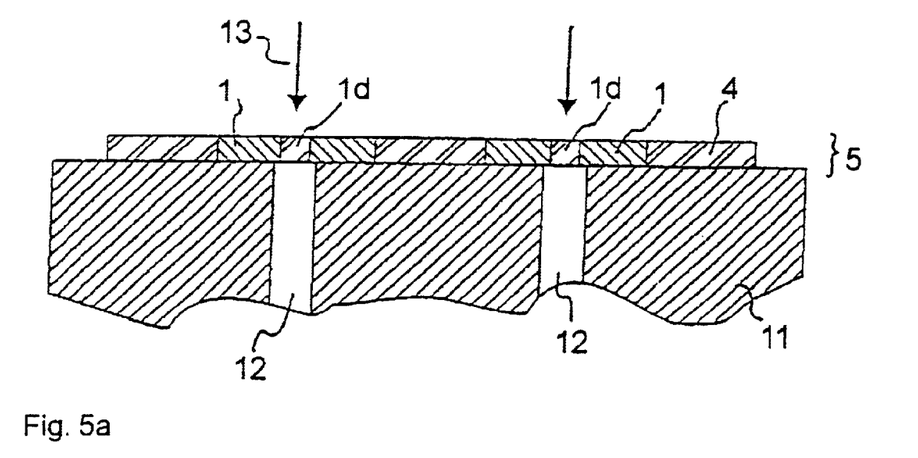
FIGS. 5a, 5b are two assembly steps using a magazine
Figure 5B:
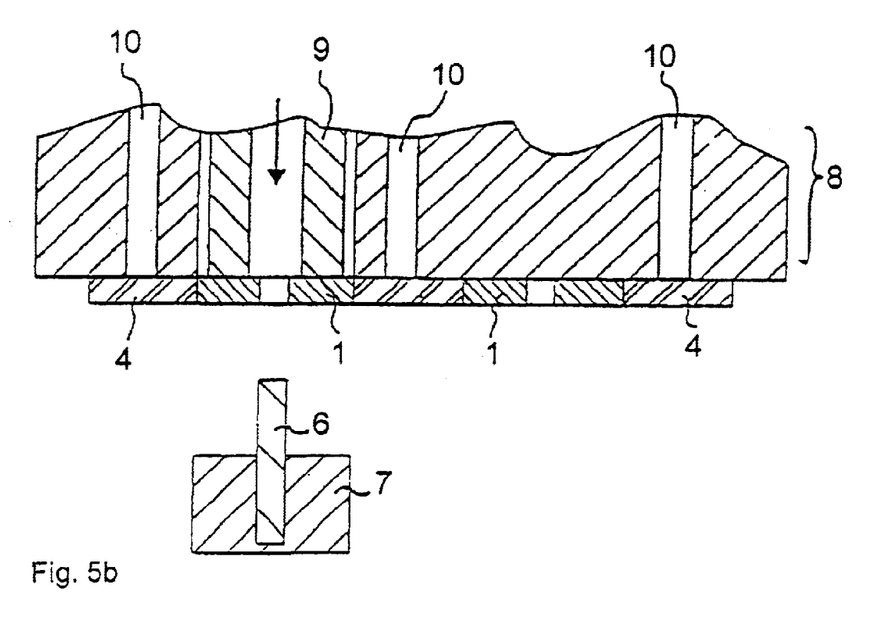

FIGS. 5a and 5b show an exemplary embodiment for the assembly of a microgear 1. First the molding material in the area of the center hole 1d of microgear 1 is removed (see FIG. 5a). This is accomplished by laying magazine 5 on a aperture plate 11 in such a manner that the area of center hole 1d of microgear 1 is situated directly above a aperture 12 in aperture plate 11. Then molding material situated in the area of center hole 1d of microgear 1 is blown out with the aid of compressed air directed through apertures 12 of aperture plate 11 vertical to upper surface 1a of the microgear.

FIG. 5b shows the assembly of a pretreated microgear 1 of this type onto a shaft 6 which is situated in an appropriate shaft support 7.

The magazine is situated on a magazine support 8 where it is preferably held fast through suction channels 10 by means of underpressure. Above gear 1, a movable die 9 is present in magazine support 8. After microgear 1 is positioned above shaft 6, ring-shaped die 9 is moved downward and microgear 1 is pressed onto shaft 6.

Figure 6:
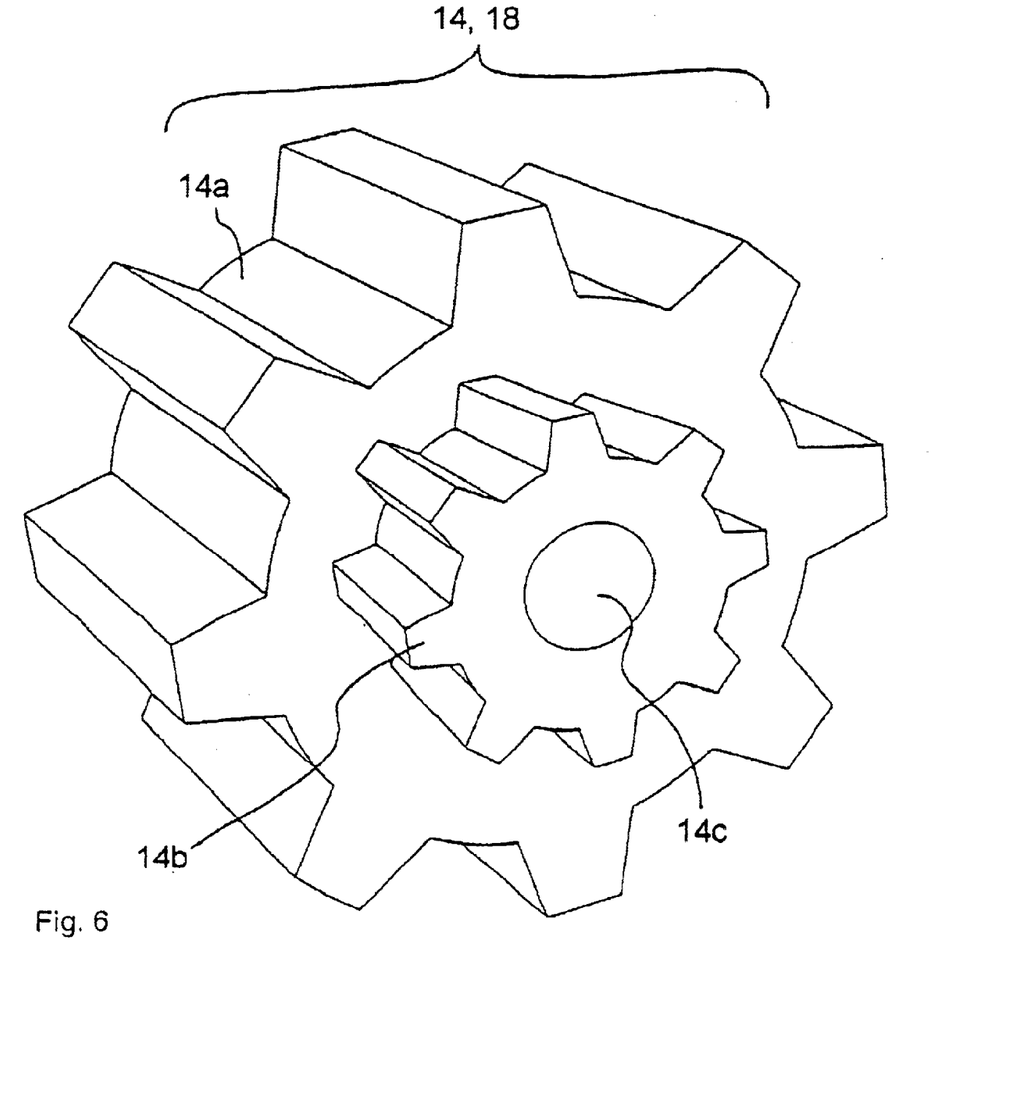
FIG. 6 is a stepped microgear in perspective representation

Depicted in FIG. 6 is the basic construction of a micro-component 18 in the form of a stepped microgear 14 with its center hole 14c and the gear steps 14a and 14b. These gear steps have differing contours and differing diameters.

Figure 7A:
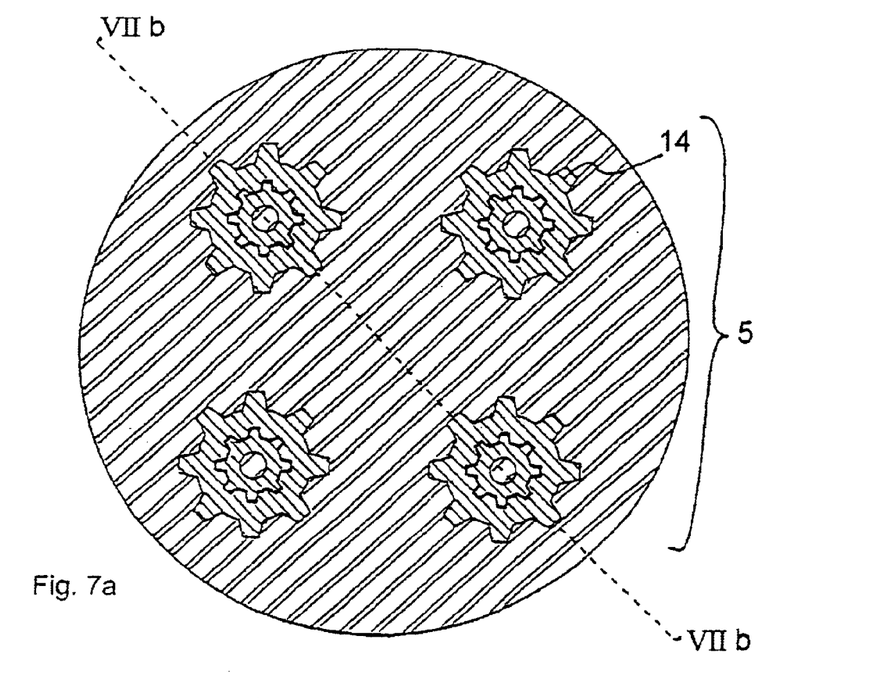
FIGS. 7a, 7b are top view and cross-section through a magazine with embedded stepped microgears.
Figure 7B:
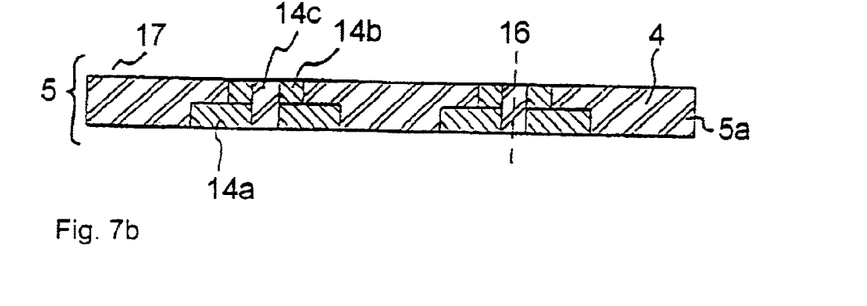

In FIGS. 7a and 7b, the magazine 5 for such stepped gears 14 is depicted in top view and in cross-section. The production of magazine 5 corresponds to the manner of production explained above. The same also applies for the assembly of the gear. Stepped gear 14 is arranged in magazine 5 so that the axis of symmetry 16 is vertical to disk surface 17 of magazine 5. The direction in which the two or more stepped gears 14 can be pressed out of the magazine is predetermined on the basis of the structure. In the depiction 7b shown here, gears 14 can be removed downward from the magazine.

| Reference Characters | |
|---|---|
| 1 | Microgear |
| 1a | Upper face of the microgear |
| 1b | Lower face of the microgear |

-continued

| Reference Characters | |
|---|---|
| 1c | Shell of the microgear |
| 1e | Center hole of the microgear |
| 2 | Component base plate |
| 2a | Upper side of component base plate |
| 3 | Mold support |
| 4 | Molding material |
| 5 | Magazine |
| 5a | Disk-shaped plate |
| 6 | Shaft |
| 7 | Shaft support |
| 8 | Magazine support |
| 9 | Die |
| 10 | Suction channel |
| 11 | Aperture plate |
| 12 | Apertures in aperture plate |
| 13 | Compressed air |
| 14 | Stepped gear |
| 14a | Gear step |
| 14b | Gear step |
| 15 | Coating |
| 16 | Axis of symmetry |
| 17 | Plane of plate |
| 18 | Micro-component |

What is claimed:

1. A magazine comprising: a disc-shaped plate made of a hardened molding material which encompasses a micro-component at least on its lateral sides, the molding material having been cast about the micro-component to ensure a positive fit of the lateral sides of the micro-component with the molding material.

2. The magazine according to claim 1 wherein the micro-component does not taper in the direction in which it is to be pushed out of the magazine.

3. The magazine according to claim 1, wherein the plate has an exterior contour which conforms to that of a compact disc or a 5-inch silicon disk.

4. The magazine according to claim 1, wherein the plate is composed of plastic, paraffin, or wax.

5. The magazine according to claim 1, wherein the plate is composed of optically transparent material.

6. The magazine according to claim 1, wherein the plate is composed of PMMA.

7. The magazine according to claim 1, wherein the magazine further comprises stabilizing elements within the hardened molding material.

8. The magazine according to claim 1, wherein the plate encompasses the micro-component such that the axis of symmetry of the micro-component is vertical to the plane of the plate.

9. The magazine according to claim 8, wherein the micro-component does not taper in the direction in which it is to be pushed out of the magazine.

10. The magazine according to claim 9, wherein the plate has an exterior contour which conforms to that of a compact disc or a 5-inch silicon disk.

11. The magazine according to claim 10, wherein the plate is composed of plastic, paraffin, or wax.

12. The magazine according to claim 11, wherein the plate is composed of optically transparent material.

13. The magazine according to claim 12, wherein the plate is composed of PMMA.

14. The magazine according to claim 13, wherein the magazine further comprises stabilizing elements within the hardened molding material.

* * * * *